Sept. 27, 1949. G. F. HODSON 2,482,774
APPARATUS FOR COATING EGGS FOR BREAKING
Original Filed March 30, 1945
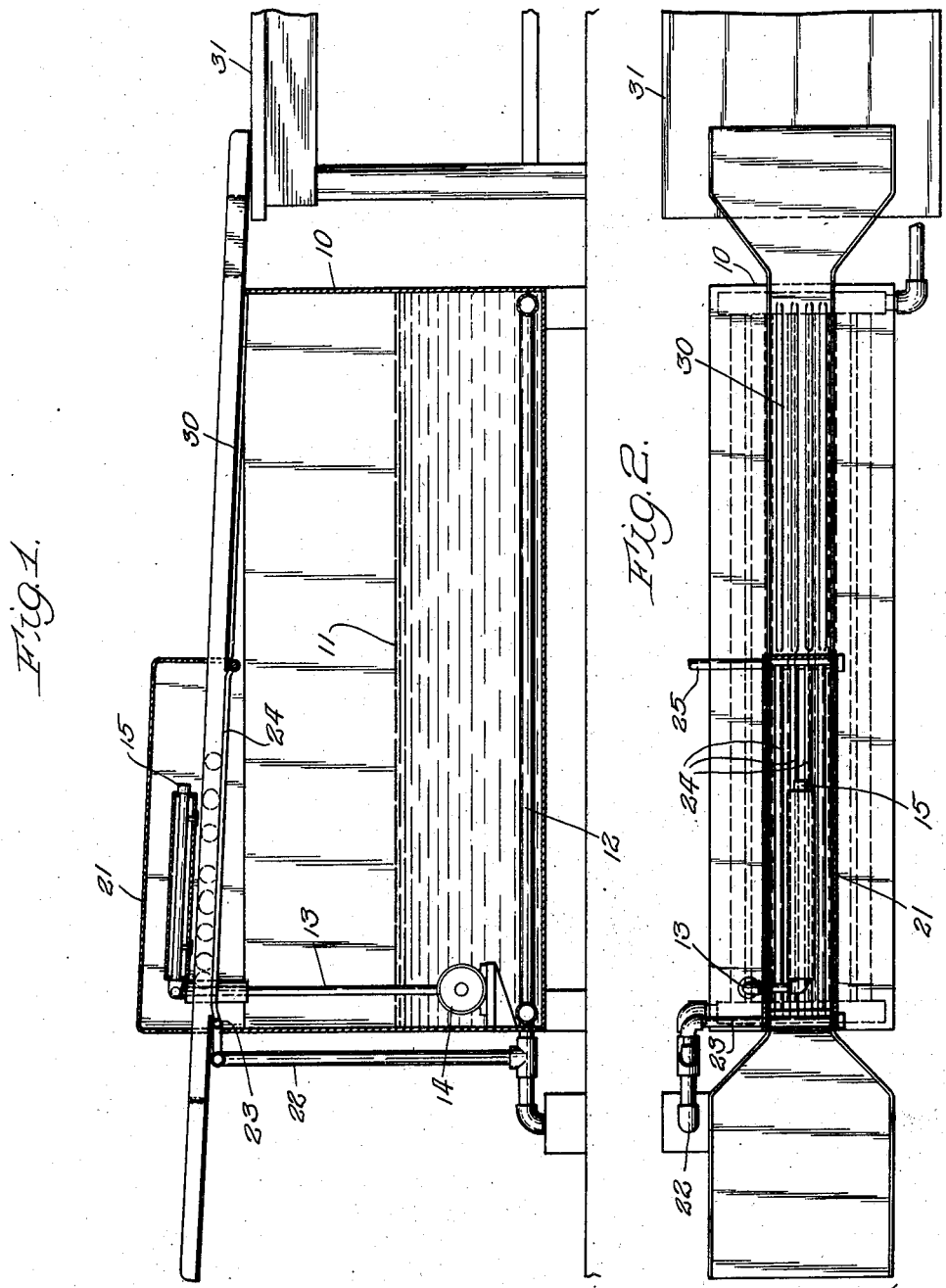

Patented Sept. 27, 1949

2,482,774

UNITED STATES PATENT OFFICE 2,482,774

APPARATUS FOR COATING EGGS FOR BREAKING

George F. Hodson, Altus, Okla., assignor to Wilson & Co. Inc., a corporation of Delaware Original application March 30, 1945, Serial No. 585,706. Divided and this application March 18, 1946, Serial No. 655,323

4 Claims. (Cl. 91—44)

This invention relates to decontaminating eggs for breaking and more particularly to an apparatus for coating unwashed eggs with a thin plastic layer of thermoplastic material prior to breaking.

Eggs, when received from the producer, are frequently or generally extremely dirty and this dirt is of various types which are contaminated to various degrees. The dirt may be removed by washing but a thorough washing of the eggs involves considerable labor. Moreover there are many eggs which have small holes or cracks or checks which cannot be washed without having the wash water penetrate within the shell. Such eggs, therefore, are not washed in commercial operations.

It has now been discovered that the contamination caused by dirt upon the surface of the egg may be greatly reduced by the application to the unwashed eggs of a thin layer of thermoplastic material immediately prior to breaking. Checked eggs or other eggs in which the shell is broken or incomplete may also be treated by this process. In commercial operations a test of the process indicated that enough otherwise unusable eggs can be saved by the present process to pay for the entire cost of the operation on all eggs.

The drawings indicate an apparatus suitable for the application of the plastic coating.

Figure 1 is a side elevation of the coating apparatus, partially in section; and Figure 2 is a top plan view, likewise partially in section, of the same apparatus.

As there shown, the wax 11 is maintained within the container 10 and heating means 12 are provided for keeping it warm. The wax is pumped through the line 13 by the pump 14 to a spray device 15. The spray device is immediately above tracks 20 down which the eggs are rolled. The spray is covered by a hood 21 and hot water is supplied through the line 22 to the header 23. A plurality of heating coils 24, connected to the header 23, form the tracks down which the eggs pass. Hot water and/or steam enters the pipes 24 from the header 23 and passes out through the line 25. The heating means 12 beneath the wax level in the container 10 is likewise heated by hot water and/or steam.

A suitable container 10 is about 30 inches deep, 6 feet long, and 18 inches wide. A suitable track is about 6 inches wide and has a side to guide the eggs. The eggs are rolled down the track with their long axes transverse to the long axis of the tracks. They thus pass under the spray in such a manner as to expose the entire egg to treatment. The pipes 24 are suitably ½ inch pipes. The pipes extend about two-thirds of the way or about 4 feet across the tank, the sprayer occupying approximately the first two feet of this distance, and the latter 2 feet providing for drainage of the wax from the eggs while they are still warm. A suitable slope for the tracks is about ½ inch drop for each running foot. The latter portion of the guide is made up of any suitable track members 30 which are unheated. The eggs are delivered, through a wall if desired, to the breaking table 31.

The wax employed is preferably that known as "poultry pulling wax." This is a wax now much used in the poultry industry for removal of feathers from birds. The wax should not contain more than 25% paraffin because it becomes too brittle with a greater proportion than that. The wax is applied at a temperature of 180–200° F., at which temperature it has some sterilizing effect due to the heat. The main value of the wax, however, is in providing a coating for the dirt so that it will not break loose from the shell when the egg is broken.

In many instances the dirt on an egg shell is in the form of large clumps or chunks. The wax does not penetrate through these dirt particles to the shell and it is, therefore, important that the wax retain some plasticity when the egg is broken or cut. It has been found that with poultry pulling wax, particularly where the breaking of the eggs is done shortly after the coating, the wax retained sufficient plasticity to seal these clumps of dirt through the cut so that no dirt drops from the shell. Likewise it is desired that no wax should shatter into the egg cups. This, however, is less serious because most of such shattered wax would be caught in the strainer.

It has been found that some eggs may be treated by this process even if the egg is leaking, provided that it is leaking from a crack where the shell edges are close together.

The egg may, of course, be dipped into hot wax or may be caused to roll through a layer of wax, but the spray method is preferred for simplicity.

Various thermoplastic materials may be employed, provided they are molten at an appropriately low temperature and are non-plastic enough to break at handling temperatures. As already pointed out, the wax should retain a substantial degree of plasticity at the time it is cut or broken. For reasons of economy, paraffin base waxes are preferred. The fruit industry employs an edible wax for waxing fruit which may be employed for the present purposes.

In general it is preferred to coat all of the egg with a thermoplastic material, but under some conditions the ends of the egg may be disregarded or coated less carefully. In such cases, however, additional care must be taken to fracture or break the egg within the area covered by the thermoplastic material.

This application is a division of my co-pending application, Serial No. 585,706, filed March 30, 1945, now Patent No. 2,439,808, issued April 20, 1948.

The foregoing detailed description has been given for clearness of understanding only, and no unnecessary limitations should be understood therefrom.

What I claim as new, and desire to secure by Letters Patent is:

1. Egg treating apparatus comprising inclined tracks along which the eggs roll, said tracks having openings therebetween and being adapted to support the eggs, wax spraying means immediately above the tracks and extending substantially parallel thereto, said spraying means being adapted to spray wax over a substantial distance along the track whereby an egg rolling along said track will be subjected to wax spray on all sides thereof, a wax container beneath the track, means for heating wax therein, means independent of the heated wax in the container for heating at least a portion of the track, and means for withdrawing heated wax from the container and delivering it to the spraying means.

2. An apparatus as set forth in claim 1 in which the spray means is adapted to spray over a distance of approximately 2 feet.

3. An apparatus as set forth in claim 1 in which the spray means is adapted to spray over a distance of approximately 2 feet and the open track extends for a distance of approximately 2 feet beyond the spray.

4. Egg treating apparatus comprising inclined tracks along which the eggs roll, said tracks having openings therebetween, wax spraying means immediately above the tracks and extending substantially parallel thereto, said spraying means being adapted to spray wax over a substantial distance along the tracks whereby an egg rolling on said track will be subjected to wax spray on all sides thereof, a first heating means for heating at least a portion of the track, a wax container beneath the track, a second heating means independent of the first heating means for heating wax in the container and means for withdrawing heated wax from the container and delivering it to the wax spraying means.

GEORGE F. HODSON.

REFERENCES CITED

The following references are of record in the file of this patent:

UNITED STATES PATENTS

| Number | Name | Date |
|---|---|---|
| 1,696,703 | Zellner | Dec. 25, 1928 |
| 1,985,843 | Skinner | Dec. 25, 1934 |
| 2,014,646 | Christion et al. | Sept. 17, 1935 |
| 2,128,028 | Hampton | Aug. 23, 1938 |
| 2,153,296 | Brogden | Apr. 4, 1939 |